R. P. JACKSON.
CURRENT RECTIFYING APPARATUS.
APPLICATION FILED MAR. 9, 1908.

931,124.  Patented Aug. 17, 1909.

WITNESSES:
C. L. Belcher
Otto J. Schairer

INVENTOR
Ray P. Jackson
BY
ATTORNEY

UNITED STATES PATENT OFFICE.

RAY P. JACKSON, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

CURRENT-RECTIFYING APPARATUS.

No. 931,124.  Specification of Letters Patent.  Patented Aug. 17, 1909.

Application filed March 9, 1908. Serial No. 420,064.

*To all whom it may concern:*

Be it known that I, RAY P. JACKSON, a citizen of the United States, and a resident of Wilkinsburg, in the county of Allegheny and State of Pennsylvania, have invented a new and useful Improvement in Current-Rectifying Apparatus, of which the following is a specification.

My invention relates to current-rectifying apparatus and particularly to transformers that constitute parts of such apparatus.

The object of the invention is to provide a transformer of such structure and arrangement of parts that all other auxiliary devices may be dispensed with and regulation of the operation of the rectifier be readily effected.

In the charging of storage batteries from mercury-vapor or similar current-rectifying devices, inductive resistances are usually included in the direct current circuits for the purpose of sustaining the rectified currents, and the charging of the batteries is regulated by causing suitable drops of potential in the system, either by introducing ohmic resistance into the direct current circuit or by introducing inductance into the alternating current circuit.

In order to reduce the number of pieces of apparatus to a minimum, it has been proposed to so construct and arrange the parts of the transformer from which the rectifying device is supplied that no additional means need be employed for sustaining the rectified current or for regulating the charging operation of the battery. By reason of the specific construction of the said transformer, however, it is not well adapted for use with varying numbers of battery cells, or for considerable ranges of battery voltage, such as occur at different degrees of charge of the battery, and it is accordingly the object of the present invention to provide a transformer that shall be better adapted for such service.

Figure 1:
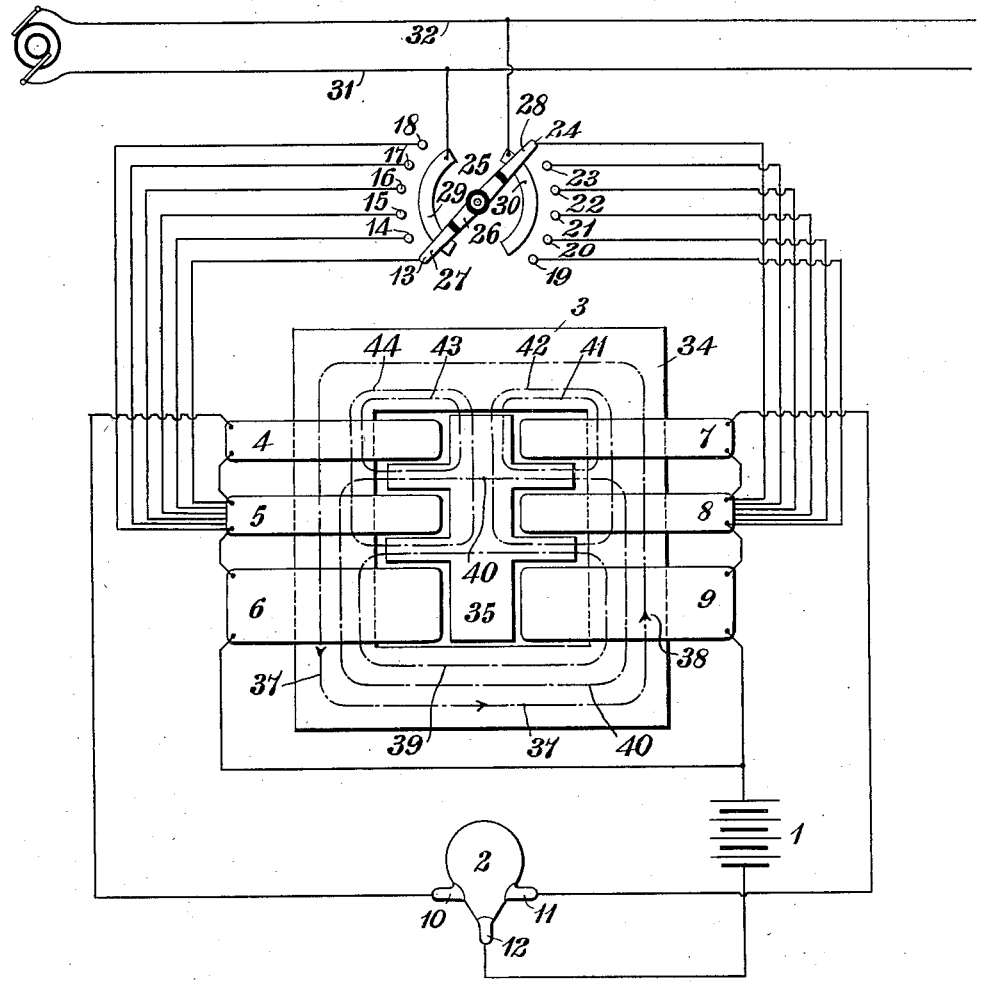
Figure 2:
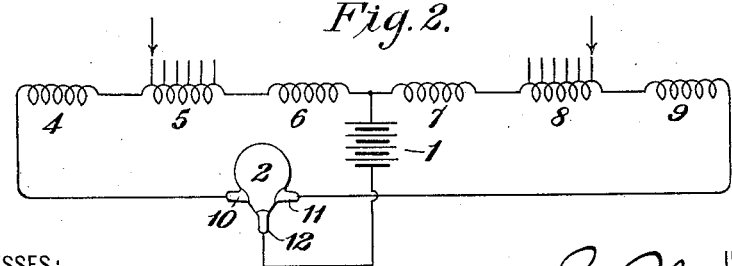

Figure 1 of the accompanying drawing is a diagrammatic view of a system embodying the invention, and Fig. 2 is a simplified diagram of the same system.

A storage battery 1, of any desired number of cells, is supplied with charging current from current-rectifying apparatus comprising a mercury-vapor or similar rectifying device 2 and a transformer 3. The transformer comprises six series-connected coils 4, 5, 6, 7, 8, and 9 that constitute the secondary winding, the extremities thereof being connected respectively to alternating current terminals 10 and 11 of the rectifying device 2, and the neutral or some other suitable intermediate point of the winding being connected to one terminal of the battery. The other terminal of the battery is connected to the negative or direct current terminal 12 of the rectifying device.

The coils 5 and 8 are subdivided by means of a suitable number of leads that are respectively connected to stationary contact terminals 13 to 24, inclusive, of a regulating device 25 comprising, further, a movable arm 26 carrying conducting members 27 and 28 which are adapted to engage the said contact terminals, as well as conducting segments 29 and 30 that are disposed adjacent thereto and are connected to circuit conductors 31 and 32. The active length of the transformer winding included between the circuit conductors, which constitutes the primary winding, may, therefore, be varied by adjusting the position of the arm 26.

The magnetizable core of the transformer 3 comprises a rectangular portion 34 upon opposite sides or legs of which the coils 4 to 9, inclusive, are mounted, three coils surrounding each leg, and an auxiliary central portion or leg 35 extending between the coils, from top to bottom and from side to side of the main core portion 34, air-gaps of suitable widths being provided between the adjacent edges of the core portions. The auxiliary core portion 35 provides, between the coils, leakage paths of relatively low and suitable reluctance and such that the primary winding, or a part thereof, will be surrounded by a leakage flux that does not also surround all of the secondary winding, and, further, such that the secondary winding, or a part thereof, will be surrounded by a leakage flux that does not also surround the primary winding. The effect of the former flux is to cause the desired drop of potential in the system, and the effect of the latter is to sustain the rectified current.

The arrangement of the coils and core parts with respect to each other is, in addition, such that in making changes in the active length of the primary winding, i. e., changes in the voltage applied to the direct current circuit, the distribution and amounts of the leakage fluxes will be so affected as to cause the leakage volts per turn of the winding surrounding the primary leakage flux to vary in substantially the same ratio as the primary and secondary volts per turn, with the result that the power factor of the rectifying apparatus remains approximately uniform under all conditions of operation. In order, also, that the amounts of current supplied to the battery may vary through substantially the same range for each step of the regulator, it is desirable that the drop of potential in the system remain an approximately constant percentage of the secondary voltage, and in order that the minimum limiting value of the direct current at which the rectifying operation will continue may be approximately the same for each step of the regulator, i. e., in order that the sustaining effect may remain approximately constant, it is desirable that the leakage flux which serves to sustain the rectified current should vary approximately in proportion to variations in the secondary voltage of the transformer. The structure and arrangement of the parts of the transformer, as shown, are such as to secure these results.

When beginning the charging operation, the connections should be arranged to produce a low secondary voltage, because of the low voltage of the battery in its uncharged condition, and, accordingly, the regulator arm 26 should occupy the position indicated, providing, of course, that the battery comprises the minimum number of cells which the apparatus is adapted to charge. The primary winding then comprises all of coils 5, 6, 8, and 9, the main flux produced thereby traversing a path indicated by the broken line 37, its direction during a given half cycle being indicated by the pointers 38. The secondary flux opposes the main primary flux, and, by reason of the relatively low reluctances of the leakage paths provided by the core portion 35, primary leakage fluxes that do not surround the whole of the secondary winding are caused to traverse paths indicated by the broken lines 39 and 40. These leakage fluxes have the same effect as the presence of inductive resistance between the transformer and the supply circuit, or of the presence of ohmic resistance in the direct current circuit, i. e., of causing a drop of potential in the system for regulating purposes. These leakage fluxes, however, do not have any sustaining effect upon the rectified current, since they simply serve to shift the phase of the alternating current with respect to the electromotive force.

By reason of the opposition of the primary and secondary fluxes, secondary leakage fluxes are also caused to traverse the relatively low reluctance paths provided by the core portion 35, the said paths being indicated, during one-half cycle of the alternating current, by the lines 41 and 42, and during the other half cycle by the lines 43 and 44. It will be observed that the secondary leakage fluxes traverse the central portion of the core part 35 in the same direction for each half cycle of the alternating current. There is, therefore, no necessity of reversing the magnetism, or of fully re-magnetizing the said portion of the magnetic circuit, with the result that the increase of current in each half of the secondary winding will be but slightly delayed. On the other hand, the decrease of current in each half of the secondary winding is considerably delayed by reason of the energy previously stored thereby in the portions of the magnetic circuit that are traversed by the secondary leakage fluxes, with the result that the uni-directional or rectified currents, that are derived from the respective halves of the secondary winding during successive half cycles of the alternating current, overlap. The secondary leakage flux, therefore, has the same effect as the presence of inductive resistance in the direct current circuit, i. e., of sustaining the direct or rectified current or of preventing it from falling below a definite or predetermined value. The leakage fluxes indicated by the lines 41 to 44, inclusive, have no effect in causing a drop of potential in the system, because the direction of the said fluxes in the core portion 35 does not change.

As the battery becomes charged, its voltage increases and the amount of charging current accordingly decreases. When the current delivered to the battery has decreased to a predetermined value, the sustaining effect afforded by the leakage fluxes indicated by the lines 41 to 44, inclusive, becomes insufficient to sustain the rectified current, and the rectifying process, therefore, is interrupted. If the battery is not, at that time, fully charged, the regulator arm 26 should be moved another step in a clockwise direction for the purpose of removing portions of the coils 5 and 8 from the primary circuit of the transformer, which, in turn, serves to increase the voltage applied to the secondary circuit. In general, the mode of operation remains as previously described, though, upon removing portions of the coils 5 and 8 from the primary circuit of the transformer, a greater amount of primary leakage flux is caused to traverse the path indicated by the line 39 and a smaller amount to traverse the path indicated by the line 40, while the total amount of leakage is increased.

The changes in the amount and distribution of the leakage fluxes are such that the leakage volts per turn of the winding surrounding the primary leakage flux change substantially in direct proportion to the change in the primary and secondary volts per turn, and also such that the change in the sustaining effect afforded by the fluxes indicated by the lines 41 to 44, inclusive, is substantially proportional to the changes in the secondary voltage. The power factor of the apparatus, therefore, remains substantially the same as before the movement of the regulator arm and the rectifying operation will continue until the rectified current has decreased to substantially the same value as that at which the operation ceased before movement of the regulator arm.

If the battery cannot be fully charged with the conducting members 27 and 28 in engagement with contact terminals 14 and 23, respectively, the regulator arm should be moved step by step in a clockwise direction until the desired degree of charge is obtained. In continuing the movement of the regulator arm in a clockwise direction, the total amount of primary leakage flux increases and more of the flux indicated by the line 40 is gradually diverted into the path indicated by the line 39, with the result that the conditions above described continue to prevail.

The range of direct current voltages obtainable from the apparatus is such, or may be such in practice, as to adapt it to fully charge a storage battery the voltage of which may change considerably from no-charge to fully-charged condition, or to adapt it for use in the charging of batteries comprising considerably different numbers of cells. Since the drop of potential in the system is proportional to the product of the primary leakage flux and the number of turns of the winding surrounding this flux, this result would not occur if the distribution of the leakage flux were not altered at the same time that it is changed in amount, or at the same time that the secondary voltage is changed.

While the invention is primarily intended for use in connection with the charging of storage batteries, it is not limited to such use, but is equally applicable in connection with apparatus employed for other purposes.

I claim as my invention:

1. A transformer comprising subdivided coils, and leakage paths of relatively low reluctance between the coils, in combination with means for varying the points of connection to the subdivided coils, and a current-rectifying device supplied from the transformer, the coils and leakage paths of the transformer being so arranged with respect to each other that upon varying the points of connection to the coils the sustaining effect upon the rectified current afforded by the transformer will vary substantially in proportion to variations in the secondary voltage.

2. A transformer comprising subdivided coils, and leakage paths of relatively low reluctance between the coils, in combination with means for varying the points of connection to the subdivided coils, and a current-rectifying device supplied from the transformer, the coils and leakage paths of the transformer being so arranged with respect to each other that, upon varying the points of connection to the coils, the power factor of the apparatus will remain substantially uniform and the sustaining effect upon the rectified current afforded by the transformer will vary substantially in proportion to variations in the secondary voltage.

3. In a transformer, the combination of a winding comprising a plurality of coils affording primary and secondary circuits, means for varying the active length of one of the transformer circuits, and leakage paths of relatively low reluctance between the coils arranged to cause variations in the distribution of the leakage fluxes with variations in the active length of the said transformer circuit.

4. A transformer comprising a magnetizable core having two legs, a plurality of coils surrounding each core leg, those occupying intermediate positions being subdivided, and leakage paths of relatively low reluctance between the coils.

5. A transformer comprising a magnetizable core having two legs, a plurality of coils surrounding each core leg, those occupying intermediate positions being subdivided, and leakage paths of relatively low reluctance between the coils, in combination with means for adjusting the points of connection to the subdivided coils.

6. A transformer comprising subdivided coils, and leakage paths of relatively low reluctance between the coils, in combination with means for varying the points of connection to the subdivided coils, the coils and leakage paths being so arranged with respect to each other that, upon varying the points of connection to the coils, variations in the distribution of the leakage fluxes are also effected.

7. A transformer comprising subdivided coils, and leakage paths of relatively low reluctance between the coils, in combination with means for varying the points of connection to the subdivided coils, the coils and leakage paths being so arranged with respect to each other that, as the volts per turn of the primary and secondary windings are varied, proportionate variations are effected in the leakage volts per turn of the winding surrounding the primary leakage flux.

8. A transformer comprising subdivided coils, and leakage paths of relatively low reluctance between the coils, in combination with means for varying the points of connection to the subdivided coils, the coils and leakage paths being so arranged with respect to each other that, upon varying the points of connection to the coils, the power factor of the transformer will remain substantially uniform.

In testimony whereof, I have hereunto subscribed my name this 27th day of February, 1908.

RAY P. JACKSON.

Witnesses:
R. B. INGRAM,
BIRNEY HINES.